3,412,084
DERIVATIVES OF GLYCYRRHETINIC AND
OLEANOLIC ACIDS
John Cameron Turner, West Wickham, and William Alan
McFarlane Davies, Ilford, England, assignors to Biorex
Laboratories Limited, London, England
No Drawing. Filed Feb. 9, 1966, Ser. No. 526,072
Claims priority, application Great Britain, Feb. 11, 1965,
5,891/65; Oct. 7, 1965, 42,551/65
21 Claims. (Cl. 260—239)

The present invention is concerned with new derivatives of glycyrrhetinic and oleanolic acids and with the preparation thereof. The new derivatives according to the present invention have been found to possess interesting pharmaceutical properties, such as an excellent anti-inflammatory action and a low toxicity.

The two parent acids on which the new compounds are based have the following structural formulae:

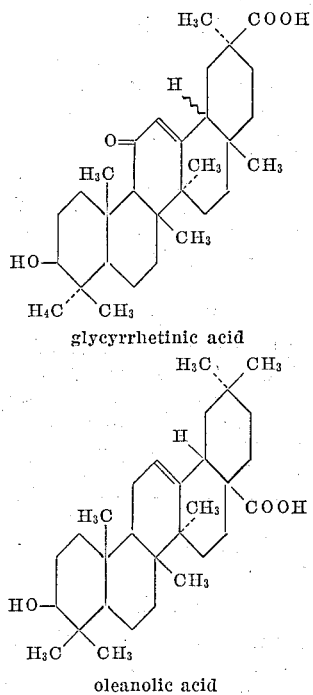

The new compounds according to the present invention can be represented by the general formula:

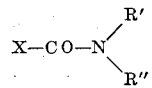

wherein R' and R", which may be the same or different, are hydrogen atoms or unsubstituted or substituted alkyl, cycloalkyl, aralkyl or aryl radicals or can be joined together to form, with the nitrogen atom to which they are attached, a heterocyclic radical, which may contain further hetero atoms, such as nitrogen, oxygen or sulphur atoms, and which may be substituted, and X is the residue of glycyrrhetinic or oleanolic acid, the hydroxyl group of which may be acylated with a mono- or polycarboxylic acid, any carboxylic acid groups therein being either in the free acid form or in the salt form, or X is the residue of 3-keto-glycyrrhetinic acid or of 3-keto-oleanolic acid.

When R' and R" are alkyl radicals, they preferably contain up to 6 carbon atoms (e.g. methyl, ethyl, propyl, isopropyl, butyl and hexyl radicals). When R' and R" are cycloalkyl radicals, they preferably contain 4–8 carbon atoms (e.g. cyclobutyl, cyclohexyl and cyclooctyl). When R' and R" are aralkyl radicals, they are preferably $C_1$–$C_4$ alkyl radicals bearing a benzene ring (e.g. benzyl and ethyl-benzene radicals). When R' and R" are aryl radicals, they are preferably phenyl radicals, which may be substituted by, for example, carboxylic acid groups, esterified carboxylic acid groups, halogen atoms and alkyl or haloalkyl radicals. When R' and R" are joined to form a ring, this ring preferably contains 4–8 carbon atoms and possibly also a sulphur, oxygen or nitrogen atom or an alkyl-substituted nitrogen atom (e.g. a heptamethylene imide, piperazine, N-methyl piperazine, or morpholine ring).

Examples of acids with which the 3-hydroxyl group may be esterified are preferably aliphatic mono- and dicarboxylic acids containing up to 20 carbon atoms, such as acetic acid, propionic acid, butyric acid, malonic acid, maleic acid, lauric acid, stearic acid and succinic acid.

In order to prepare the new compounds according to the present invention, the hydroxyl group of the parent acid is first protected by acylation, for example, by reacting with an appropriate acid anhydride or acid halide, the carboxylic acid group in the acyl compound so obtained then converted into an acid halide group, preferably an acid chloride group, for example, by reaction with thionyl chloride, the acid halide so obtained thereafter reacted with an amine of the general formula R'.NH.R", in which R' and R" have the same meanings as above, and then, if desired, the acyl group hydrolysed to liberate the hydroxyl group.

The following examples are given for the purpose of illustrating the present invention:

Example 1

30 g. 3-O-acetyl-18β-glycyrrhetinic acid chloride and 60 g. cyclohexylamine are heated at 80° C. for 1 hour and the reaction mixture then cooled and poured into 50 cc. petroleum ether. The solid product obtained is filtered off and recrystallised, first from methanol and then from aqueous dimethyl formamide. There are obtained 10 g. 3-O-acetyl-18β-glycyrrhetinic acid-30-(cyclohexylamide) in the form of a white, odourless powder melting at 264–265° C.; $[\alpha]_D^{23} = +133 \pm 1°$ (c.=1% in chloroform).

In an analogous manner, there can also be prepared 3-O-acetyl - 18β - glycyrrhetinic aicd-30-piperazinamide; M.P. 273–274° C.

Example 2

20 g. 3-O-acetyl-18β-glycyrrhetinic acid chloride and 50 g. heptamethylene-imide are heated at 100° C. for 1 hour and the reaction mixture cooled and 300 cc. petroleum ether added thereto. The product obtained is filtered off and recrystallised several times from aqueous ethanol. There are obtained about 6 g. 3-O-acetyl-18β-glycyrrhetinic acid-30-(heptamethylene-imide) in the form of white, odourless needles having a melting point of 249.5–250° C.; $[\alpha]_D^{25} = +122 \pm 1°$ (c.=1% in chloroform).

Example 3

35 g. 3-O-acetyl-18β-glycyrrhetinic acid chloride are dissolved in 200 cc. diethylamine and the solution left at room temperature for 1 hour. The reaction mixture is then poured into a large volume of water and the precipitated solid product filtered off and recrystallised, first from methanol and then from methanol-ethyl acetate (4:1). There are obtained 15 g. 3-O-acetyl-18β-glycyrrhetinic acid di-ethylamide in the form of white, odourless needles melting at 228–229° C.; $[\alpha]_D^{20} = +117.5 \pm 1°$ (c.=1% in chloroform).

Example 4

3-O-lauroyl-18α-glycyrrhetinic acid is converted into the corresponding acid chloride by heating in benzene with a large excess of thionyl chloride, the benzene and excess thionyl chloride distilled off in a vacuum and the last traces of thionyl chloride removed by redissolving the product in dry benzene and again evaporating. The acid chloride obtained is used as such without further purification.

2.5 equivalents of N-methyl-piperazine are added to a benzene solution of this acid chloride and the solution boiled for 20 minutes. After cooling, N-methyl-piperazine hydrochloride formed as a by-product is filtered off, the filtrate concentrated to a small volume and the residue allowed to crystallise. For purification, the product is recrystallised from methanol to give a 30–40% yield of 3-O-lauroyl-18α-glycyrrhetinic acid-30-(N-methyl-piperazinamide) in the form of white, odourless powder melting at 159–160° C.; $[\alpha]_D^{20} = +47.5 \pm 1°$ (c.=1% in chloroform).

In an analogous manner, there is obtained 3-O-lauroyl-18β-glycyrrhetinic acid - 30 - (N-methyl-piperazinamide), which can be purified by recrystallisation from petroleum ether and then from hexane; M.P. 105–105.5° C.; $[\alpha]_D^{23} = +105 \pm 1°$ (c.=1% in chloroform).

Example 5

18 g. 18β-glycyrrhetinic acid-30-anthranilide in 150 cc. dry pyridine were heated for 9 hours at 100° C. with 12.2 g. succinic anhydride. A little water was added to the hot reaction mixture, to decompose any anhydrides formed, followed by 200 cc. ethanol. 400 cc. 50% hydrochloric acid and 200 cc. water were then added and the solid product obtained filtered off and washed with water and then dried to give 21 g. of crude product. After several recrystallisations from ethanol, there are obtained 16 g. 3-O-(β-carboxy-propionyl)-18β-glycyrrhetinic acid-30-anthranilide containing alcohol of crystallisation. Upon heating, this alcohol of crystallisation is lost at about 200° C. and the compound melts at 265–266° C.; $[\alpha]_D^{20} = +124 \pm 1°$ (c.=1% in chloroform as the alcoholate).

From this anthranilide, there can be prepared, in known manner, the corresponding disodium salt; $[\alpha]_D^{20} = +166 \pm 1°$ (c.=1% in water).

Example 6

Starting from 3-keto-glycyrrhetinic acid chloride and N-methyl-piperazine, using the method described in Example 1, there is prepared 3-keto-glycyrrhetinic acid-30-(N-methyl-piperazinamide).

Example 7

3-O-acetyl-18β-glycyrrhetinic acid chloride (prepared by boiling a mixture of acetyl glycyrrhetinic acid and thionyl chloride for at least 30 minutes and then removing excess thionyl chloride) is heated at 80° C. for one hour with a fourfold excess of N-methyl-piperazine. The reaction mixture is then poured into cold water and the reaction product which separates is filtered off, washed with cold water and dried. After recrystallisation from dichloromethane-petroleum ether and then from absolute alcohol, pure 3-O-acetyl-18β-glycyrrhetinic acid-30-(N-methyl-piperazinamide) is obtained in a yield of about 50% of the theoretical yield; M.P. 243–245° C.; $[\alpha]_D^{20} = +120 \pm 1°$ (c.=1% in chloroform).

Example 8

9 g. of the 3-O-acetyl-18β-glycyrrhetinic acid-30-(N-methyl-piperazinamide) obtained as in Example 7 are heated for 2 hours at 60° C. in 200 ml. 50% aqueous alcohol containing 10 g. potassium hydroxide. The reaction mixture is then poured into cold water and the precipitated reaction product filtered off, washed with water and dried. After recrystallisation from aqueous dimethyl formamide, there are obtained 5 g. 18β-glycyrrhetinic acid-30-(N-methyl-piperazinamide); M.P. 252–253° C.; $[\alpha]_D^{20} = +140 \pm 1°$ (c.=1% in chloroform).

Example 9

Acetyl 18β-glycyrrhetinic acid chloride is heated at about 80° C. for 30 minutes with a fourfold excess of m-trifluoromethyl-aniline. The reaction mixture is then poured into dilute hydrochloric acid and the precipitated reaction product filtered off, washed first with dilute hydrochloric acid and then with water and dried. After recrystallisation from aqueous ethanol, pure 3-O-acetyl-18β-glycyrrhetinic acid-30-(m-trifluoromethyl-aniline) is obtained in a yield of about 70% of the theoretical yield; M.P. 262–263° C.; $[\alpha]_D^{20} = +166 \pm 1°$ (c.=1% in chloroform).

Example 10

15 g. acetyl oleanolic acid chloride and 25 g. methyl anthranilate are well mixed together and heated for 40 minutes at 170–180° C. After cooling, the reaction mixture is dissolved in ether and extracted several times with dilute hydrochloric acid and then with water. After evaporation of the combined ether extracts, there is obtained a crude product which is purified by recrystallisation from aqueous ethanol. There are thus obtained 15 g. 3-O-acetyl-oleanolic acid-28-(o-carbomethoxy-anilide); M.P. 216–217° C.; $[\alpha]_D^{20} = 32 \pm 1°$ (c.=1% in chloroform).

Example 11

13 g. 3-O-acetyl-oleanolic acid-28-(o-carbomethoxy-anilide) and 7 g. potassium hydroxide are dissolved in 170 ml. 80% warm aqueous ethanol and heated for 2 hours at 50–60° C. The solution is then acidified with dilute hydrochloric acid and the precipitated product filtered off, washed with water and dried. The product is purified by recrystallisation from aqueous ethanol. There are thus obtained 8 g. oleanolic acid-28-(o-carboxy-aniline); M.P. 232–234° C.; $[\alpha]_D^{20} = +35 \pm 4°$ (c.=0.2% in chloroform).

Example 12

15 g. acetyl-18β-glycyrrhetinic acid chloride (prepared by boiling a mixture of acetyl-18β-glycyrrhetinic acid and thionyl chloride for at least 30 minutes and then removing excess thionyl chloride) is heated at 100° C. for 1 hour with 75 ml. pyridine and 15 g. anthranilic acid. The reaction mixture is cooled to room temperature and acidified and the solid product filtered off and recrystallised from aqueous acetic acid to give 10.3 g. of the 3-O-acetyl-30-anthranilide of 18β-glycyrrhetinic acid which has a melting point above 350° C.

Example 13

10.3 g. of the 3-O-acetyl-30-anthranilide of 18β-glycyrrhetinic acid obtained as in Example 12 are dissolved in 50% aqueous methanol containing 6 g. sodium hydroxide and the reaction mixture maintained at 50° C. for 3 hours. Acidification of the reaction mixture resulted in the precipitation of the 30-anthranilide of 18β-glycyrrhetinic acid which is isolated and purified by recrystallisation from aqueous dimethyl formamide. The yield is 8 g. and the compound has a melting point of about 355° C.;

$$E_{1\,cm.}^{1\%} = 439 \pm 5 \text{ at } 253 m\mu$$

in methanol containing 4% 1 N sodium hydroxide solution.

Example 14

20 g. acetyl-18β-glycyrrhetinic acid chloride, 30 g. methyl p-aminobenzoate and 25 ml. pyridine are heated for 2 hours at a bath temperature of 130° C. and the cooled reaction mixture then added to 300 ml. ether and 100 ml. chloroform. The solution obtained is washed with dilute hydrochloric acid and then with water. The organic layer is separated and dried over anhydrous sodium sulphate, the solution evaporated to dryness and the residue recrystallised first from aqueous alcohol and then from acetone-ether to give 17 g. of the 3-O-acetyl-30-(p-carbomethoxy-anilide) of 18β-glycyrrhetinic acid which has a melting point of 282–283° C.; $[\alpha]_D = 200 \pm 1°$ (c.=1% in chloroform).

Example 15

15 g. of the 3-O-acetyl-30-(p-carbomethoxy-anilide) of 18β-glycyrrhetinic acid obtained as in Example 14 are finely ground and warmed for 2 hours at 50° C. with 300 ml. ethanol and 50 ml. 20% potassium hydroxide solution. After allowing to cool to room temperature and leaving to stand for some time, the reaction mixture is acidified and diluted with water to give a solid product which is isolated and recrystallised from aqueous acetic acid to give 11 g. of the 30-(p-carboxy-anilide) of 18β-glycyrrhetinic acid with a melting point of about 355° C.; $[\alpha]_D = +215 \pm 4°$ (c.=0.2% in chloroform).

Example 16

A mixture of 20 g. acetyl-18β-glycyrrhetinic acid chloride and 25 ml. morpholine is heated for 1 hour at a bath temperature of 100° C. The reaction mixture is then cooled and diluted with water and the precipitated solid isolated by filtration and recrystallisation from aqueous ethanol to give 19 g. of the 3-O-acetyl-30-morpholide of 18β-glycyrrhetinic acid with a melting point of 252–254° C.; $[\alpha]_D = +129 \pm 1°$ (c.=1% in chloroform). Further recrystallisation did not result in any change of the melting point.

Example 17

17 g. of the 3-O-acetyl-30-morpholide of 18β-glycyrrhetinic acid obtained as in Example 16 are mixed with 300 ml. ethanol and 12 g. sodium hydroxide in 15 ml. water, heated to 50° C. for a few minutes to give a clear solution and the temperature then maintained at 30–40° C. for 2 hours. A crystalline precipitate begins to separate out after about 30 minutes. The reaction mixture is thereafter diluted with water and the solid product which separates is filtered off and recrystallised from aqueous alcohol to give 13.5 g. of the pure 30-morpholide of 18β-glycyrrhetinic acid which has a melting point of 243–245° C.; $[\alpha]_D = +141 \pm 1°$ (c.=1% in chloroform).

The present invention also includes within its scope pharmaceutical compositions containing one or more of the new compounds. These pharmaceutical compositions can be administered orally or parenterally in admixture with a solid or liquid pharmaceutical carrier.

Solid compositions for oral administration include compressed tablets, pills, dispersible powders and granules. In such solid compositions, at least one active compound according to the present invention is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluent commonly used in the art, such as water and liquid paraffin. Besides inert diluents, such compositions may also comprise adjuvants, such as wetting and suspension agents and sweetening and flavouring agents.

The compositions according to the present invention, for oral administration, include capsules of absorbable material, such as gelatine, containing at least one of the active substances according to the present invention, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active ingredient in the compositions of the present invention may be varied, it being necessary that it should constitute a proportion such that a suitable dosage for the desired therapeutic effect shall be obtained. In general, the preparations of the present invention should be administered, in the case of oral administration, to give 25 to 750 mg. of active substance per day and, in the case of parenteral administration, 10 to 500 mg. of active substance per day.

The following examples illustrate pharmaceutical compositions according to the present invention:

Example 18

200 mg. tablets are prepared containing:

|  | Mg. |
|---|---|
| 3-O-acetyl-18β-glycyrrhetinic acid-30-(N-methyl-piperazinamide) | 50 |
| Starch | 145 |
| Magnesium stearate | 5 |

Example 19

200 mg. tablets are prepared containing:

|  | Mg. |
|---|---|
| 3-O-acetyl-18β-glycyrrhetinic acid-30-morpholide | 50 |
| Starch | 100 |
| Lactose | 45 |
| Magnesium stearate | 5 |

By reason of their aforedisclosed properties, the compounds and compositions of the invention are useful in the treatment of inflammatory conditions, such as simple and acute inflammations, inflammation of the joints due to arthritis and the like, traumatic inflammation, etc.

What is claimed is:
1. A compound of the formula

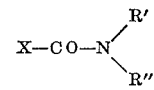

wherein R′ is a member selected from the group consisting of alkyl with 1 to 6 carbon atoms, cycloalkyl with 4 to 8 carbon atoms, phenyl, carboxyphenyl, lower alkoxycarbonylphenyl and trifluoromethylphenyl, R″ is a member selected from the group consisting of H and alkyl with 1 to 6 carbon atoms, and wherein R′ and R″ can be joined together to form, with the nitrogen atom to which they are attached, a member selected from the group consisting of heptamethyleneimido, piperazino, N-methyl piperazino and morpholino, and X–CO is a member selected from the group consisting of radicals of the formulae

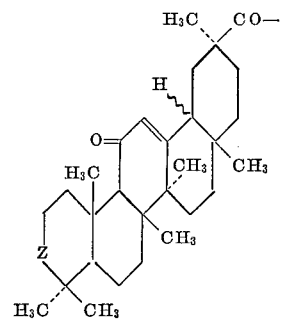

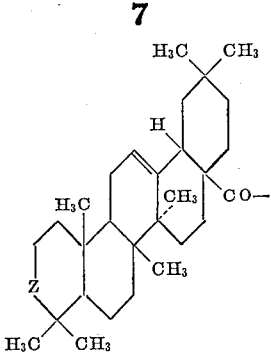

Z being one of the atom groupings

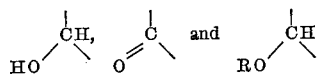

wherein R is selected from the group consisting of alkylcarbonyl with up to 20 carbon atoms, carboxy(lower)alkylcarbonyl and carboxy(lower)alkenylcarbonyl.

2. A compound according to claim 1, said compound being 3-O-acetyl-18β-glycyrrhetinic acid-30-(cyclohexylamide).

3. A compound according to claim 1, said compound being 3-O-acetyl-18β-glycyrrhetinic acid-30-piperazinamide.

4. A compound according to claim 1, said compound being 3-O-acetyl-18β-glycyrrhetinic acid-30-(heptamethyleneimide).

5. A compound according to claim 1, said compound being 3-O-acetyl-18β-glycyrrhetinic acid diethylamide.

6. A compound according to claim 1, said compound being 3-O-lauroyl-18α-glycyrrhetinic acid-30-(N-methyl-piperazinamide).

7. A compound according to claim 1, said compound being 3-O-lauroyl-18β-glycyrrhetinic acid-30-(N-methyl-piperazinamide).

8. A compound according to claim 1, said compound being 3-O-(β-carboxy-propionyl)-18β-glycyrrhetinic acid-30-anthranilide.

9. A compound according to claim 1, said compound being disodium 3-O-(β-carboxy-propionyl)-18β-glycyrrhetinic acid-30-anthranilide.

10. A compound according to claim 1, said compound being 3-keto-glycyrrhetinic acid-30-(N-methyl-piperazinamide).

11. A compound according to claim 1, said compound being 3-O-acetyl-18β-glycyrrhetinic acid-30-(N-methyl-piperazinamide).

12. A compound according to claim 1, said compound being 18β-glycyrrhetinic acid-30-(N-methyl-piperazinamide).

13. A compound according to claim 1, said compound being 3-O-acetyl-18β-glycyrrhetinic acid-30-(m-trifluoromethyl-anilide).

14. A compound according to claim 1, said compound being 3-O-acetyl-oleanolic acid-28-(o-carbomethoxy-anilide).

15. A compound according to claim 1, said compound being oleanolic acid-28-(o-carboxy-anilide).

16. A compound according to claim 1, said compound being 3-O-acetyl-18β-glycyrrhetinic acid-30-anthranilide.

17. A compound according to claim 1, said compound being 18β-glycyrrhetinic acid-30-anthranilide.

18. A compound according to claim 1, said compound being 3-O-acetyl-18β-glycyrrhetinic acid-30-(p-carbomethoxy-anilide).

19. A compound according to claim 1, said compound being 18β-glycyrrhetinic acid-30-(p-carboxy-anilide).

20. A compound according to claim 1, said compound being 3-O-acetyl-18β-glycyrrhetinic acid-30-morpholide.

21. A compound according to claim 1, said compound being 18β-glycyrrhetinic acid-30-morpholide.

References Cited

French Patent No. M2821, abstracted in Chem. Abs. 62: 6525–6, March 1965.

HENRY R. JILES, *Primary Examiner.*

C. M. SHURKO, *Assistant Examiner.*

UNITED STATES PATENT OFFICE
CERTIFICATE OF CORRECTION

Patent No. 3,412,084                November 19, 1968

John Cameron Turner et al.

It is certified that error appears in the above identified patent and that said Letters Patent are hereby corrected as shown below:

In the heading to the printed specification, line 9, after "5,891/65;" insert -- May 6, 1965, 19,063/65; --.

Signed and sealed this 3rd day of February 1970.

(SEAL)
Attest:

Edward M. Fletcher, Jr.            WILLIAM E. SCHUYLER, JR.
Attesting Officer                  Commissioner of Patents